(12) United States Patent
Min et al.

(10) Patent No.: US 10,100,920 B2
(45) Date of Patent: Oct. 16, 2018

(54) SHIFT-LEVER ASSEMBLY OF MANUAL TRANSMISSION

(71) Applicants: Hyundai Motor Company, Seoul (KR); Kyung Chang Industrial Co., Ltd., Daegu (KR)

(72) Inventors: Jeong Seon Min, Gyeonggi-do (KR); Deok Ki Kim, Gyeonggi-do (KR); Young Geun Kim, Daegu (KR)

(73) Assignees: Hyundai Motor Company, Seoul (KR); Kyung Chang Industrial Co., Ltd., Daegu (KR)

( * ) Notice: Subject to any disclaimer, the term of this patent is extended or adjusted under 35 U.S.C. 154(b) by 43 days.

(21) Appl. No.: 15/239,866

(22) Filed: Aug. 18, 2016

(65) Prior Publication Data

US 2017/0292603 A1  Oct. 12, 2017

(30) Foreign Application Priority Data

Apr. 8, 2016 (KR) .................. 10-2016-0043531

(51) Int. Cl.
*F16H 59/04* (2006.01)
*F16H 59/02* (2006.01)
*F16H 61/36* (2006.01)

(52) U.S. Cl.
CPC ......... *F16H 59/04* (2013.01); *F16H 59/0204* (2013.01); *F16H 61/36* (2013.01); *F16H 2059/026* (2013.01); *F16H 2059/0273* (2013.01)

(58) Field of Classification Search
CPC ................. F16H 61/36; F16H 59/0204; F16H 2059/026; F16H 2059/0269; F16H 2059/0273; F16H 2059/0265
See application file for complete search history.

(56) References Cited

U.S. PATENT DOCUMENTS

| 4,333,360 | A | * | 6/1982 | Simmons | F16H 59/04 267/150 |
| 4,458,549 | A | * | 7/1984 | Tani | F16H 61/36 267/150 |
| 4,583,417 | A | * | 4/1986 | Hurlow | F16H 61/36 74/471 XY |
| 4,671,131 | A | * | 6/1987 | Hurlow | F16H 61/36 74/471 XY |
| 5,896,778 | A | * | 4/1999 | Murakami | F16H 59/04 74/473.25 |
| 2004/0083842 | A1 | * | 5/2004 | Teijeiro Castro | F16H 61/36 74/473.15 |

(Continued)

FOREIGN PATENT DOCUMENTS

KR 20-1996-0010463 U 5/1996
KR 1999-005692 1/1999

(Continued)

*Primary Examiner* — William Kelleher
*Assistant Examiner* — Gregory T Prather
(74) *Attorney, Agent, or Firm* — Mintz Levin Cohn Ferris Glovsky and Popeo, P.C.; Peter F. Corless

(57) ABSTRACT

A shift-lever assembly of a manual transmission is provided. The assembly includes a lower lever that is rotatable forward and backward with respect to a shift-lever housing and is connected with one of a shift cable and a selection cable. Additionally, an upper lever is coupled to the lower lever to be rotatable left and right and is connected with a remaining one of the cables.

7 Claims, 5 Drawing Sheets

(56) References Cited

U.S. PATENT DOCUMENTS

| | | | | |
|---|---|---|---|---|
| 2005/0028634 A1* | 2/2005 | Giefer | ............... | F16H 59/044 |
| | | | | 74/473.33 |
| 2005/0160861 A1* | 7/2005 | Plietker | ............. | F16H 59/0204 |
| | | | | 74/473.15 |
| 2008/0098845 A1* | 5/2008 | Meyer | ............... | F16H 59/0204 |
| | | | | 74/473.26 |
| 2009/0217781 A1* | 9/2009 | Kusayama | ............ | F16H 59/02 |
| | | | | 74/473.15 |
| 2010/0242656 A1* | 9/2010 | Kino | ..................... | F16H 59/10 |
| | | | | 74/473.12 |
| 2010/0307277 A1* | 12/2010 | Ueta | ................. | F16H 59/0204 |
| | | | | 74/473.34 |
| 2014/0345410 A1* | 11/2014 | Yamamoto | ........... | F16H 59/105 |
| | | | | 74/473.3 |
| 2015/0101437 A1* | 4/2015 | Kim | ....................... | F16H 59/10 |
| | | | | 74/473.24 |
| 2015/0135879 A1* | 5/2015 | Jeong | ............... | F16H 59/0278 |
| | | | | 74/473.36 |
| 2015/0167828 A1* | 6/2015 | Jeong | ................. | F16H 59/105 |
| | | | | 74/473.3 |

FOREIGN PATENT DOCUMENTS

| | | |
|---|---|---|
| KR | 20-2001-0000012 U | 1/2001 |
| KR | 2002-0042352 A | 6/2002 |

\* cited by examiner

SHIFT-LEVER ASSEMBLY OF MANUAL TRANSMISSION

CROSS REFERENCE TO RELATED APPLICATION

The present application claims priority to Korean Patent Application No. 10-2016-0043531, filed Apr. 8, 2016, the entire contents of which are incorporated herein for all purposes by this reference.

BACKGROUND

Field of the Invention

The present invention relates to a shift-lever assembly of a manual transmission, and more particularly, to a shift-lever assembly of a manual transmission that prevents deterioration of durability due to curving of a shift cable during gear selection.

Description of the Related Art

In general, an automotive transmission is classified into a manual transmission, an automatic transmission, and a continuously variable transmission, and changes the torque and rate of revolution of an engine based on a driving state. A transmission shifts to a desired gear upon operation of a shift lever and has a manual mode that allows a user to change gears and an automatic mode that automatically change gears based on a vehicle speed when a user selects a particular driving mode.

Further, a shifting mode that allows one transmission to perform both manual shifting and automatic shifting has been recently developed. In such a transmission, a user may manually change gears, that is, shift to upper gears or lower gears with automatic shifting, or a transmission for automatic shifting may be provided at a side of a manual transmission. A manual transmission is operated for selecting gears in which a user moves a shift lever to the left and right and for shifting gears in which a user moves the shift lever forward and backward.

In a common manual transmission, a shift lever is connected with a shift cable and a selection cable at a lower portion of an operation rod. Accordingly, the shift cable and the selection cable are individually operated in shifting, to smooth execute shifting and smooth operation close to ideal operation is possible. However, in shift-lever assemblies that are used in the related art, shifting and selecting are performed by one ball hinge coupled to a lower portion of an operation rod, so a shift cable is curved in shifting except for the 3/4 stage at the center, so the force for operating the shift cable is unnecessarily increased and the durability of the shift cable is deteriorated.

The description provided above as a related art of the present invention is merely for helping understanding the background of the present invention and should not be construed as being included in the related art known by those skilled in the art.

SUMMARY

Accordingly, the present invention provides a shift-lever assembly of a manual transmission that provides smoother shifting by preventing a shift cable from curving upon gear selection and increases the durability of parts of the assembly.

According to one aspect of the present invention, a shift-lever assembly of a manual transmission may include: a lower lever rotatable forward and backward with respect to a shift-lever housing and connected with at least one of a shift cable and a selection cable; and an upper lever coupled to the lower lever to be rotatable left and right and connected with a remaining one of the cables.

A lever holder where the upper lever is rotatably connected may be coupled to the lower lever, the lever holder may have a lever shaft, and the upper lever may be rotatably coupled to the lever holder by the lever shaft. The upper lever may have a rotary shaft assembly rotatably coupled to the lever holder and a cable protrusion that extends from the rotary shaft assembly to be connected with the shift cable. The lever shaft may be disposed through the rotary shaft assembly in a left-right direction. The rotary shaft assembly may be inserted in the lever holder and the cable protrusion may extend from the lever holder through a holder aperture formed through the lever holder. A circular hinge portion that is a rotational center of the lever holder may be formed at left and right sides of the lever holder and a bush may be coupled to the circular hinge portions.

A housing chamber being open upward to receive the lever holder may be formed in the shift-lever housing, a housing bush groove being open upward to receive the bushes coupled to the circular hinge portions may be formed at both sides of the shift-lever housing, and a housing cover may be coupled to the shift-lever housing to cover the open top of the housing chamber. Edges of the bushes inserted in the housing bush grooves may protrude from the housing bush grooves and a cover bush groove may be formed at left and right sides of the housing cover to come in contact with the edges of the bushes extending from the housing bush grooves. The cable connected to the lower lever may be the shift cable and the cable connected to the upper lever may be the selection cable.

According to the shift-lever assembly of a manual transmission according to an exemplary embodiment of the present invention, the shift lever may be prevented from curving when the shift lever of a manual transmission is operated, thus achieving a smoother operation. Further, since curving of the shift cable is prevented, the durability of the shift cable is increased. In addition, since ball hinges are used as in the related art, it may be possible to reduce the number of parts, simplify the configuration, and decrease manufacturing costs, compared with the use of complex U-joints of the related art.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

A shift-lever assembly of a manual transmission according to an exemplary embodiment of the present invention is described hereafter with reference to the accompanying drawings.

Figure 1:
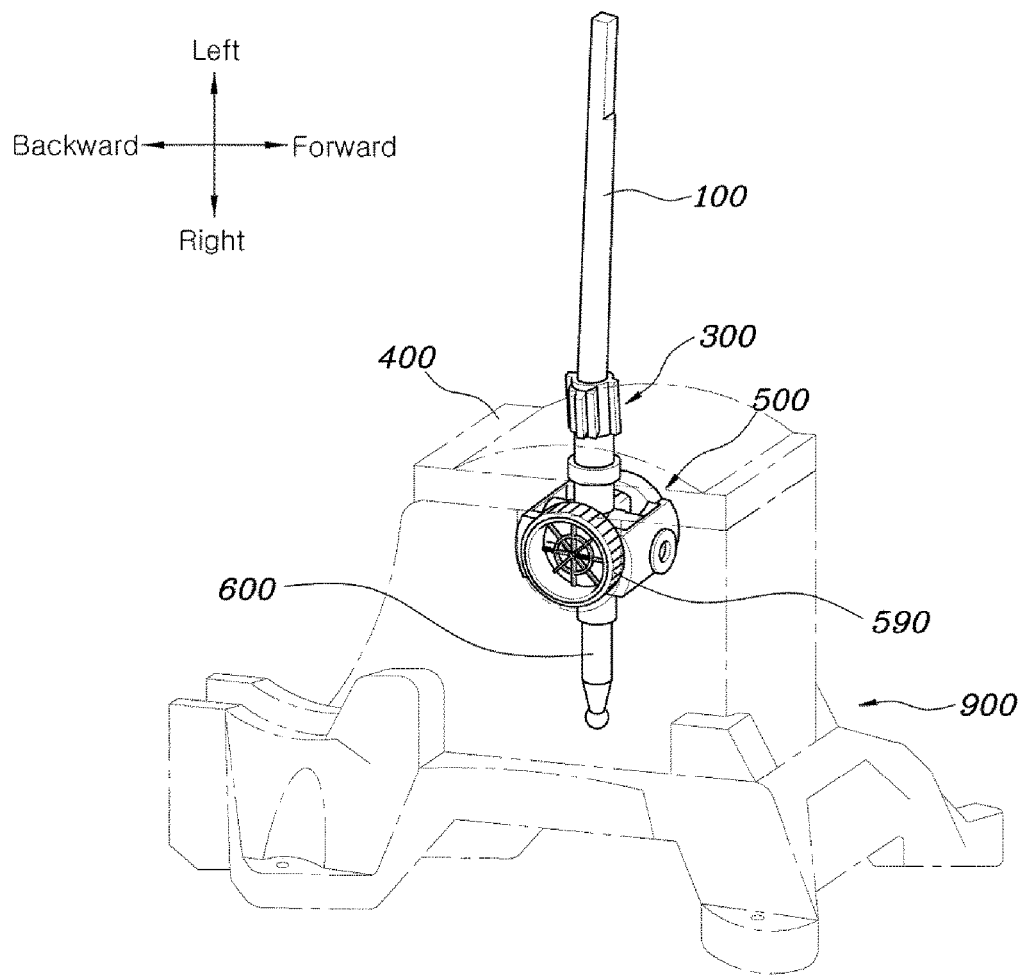
FIG. 1 is a perspective view of a shift-lever assembly of a manual transmission according to an exemplary embodiment of the present invention.
Figure 2:
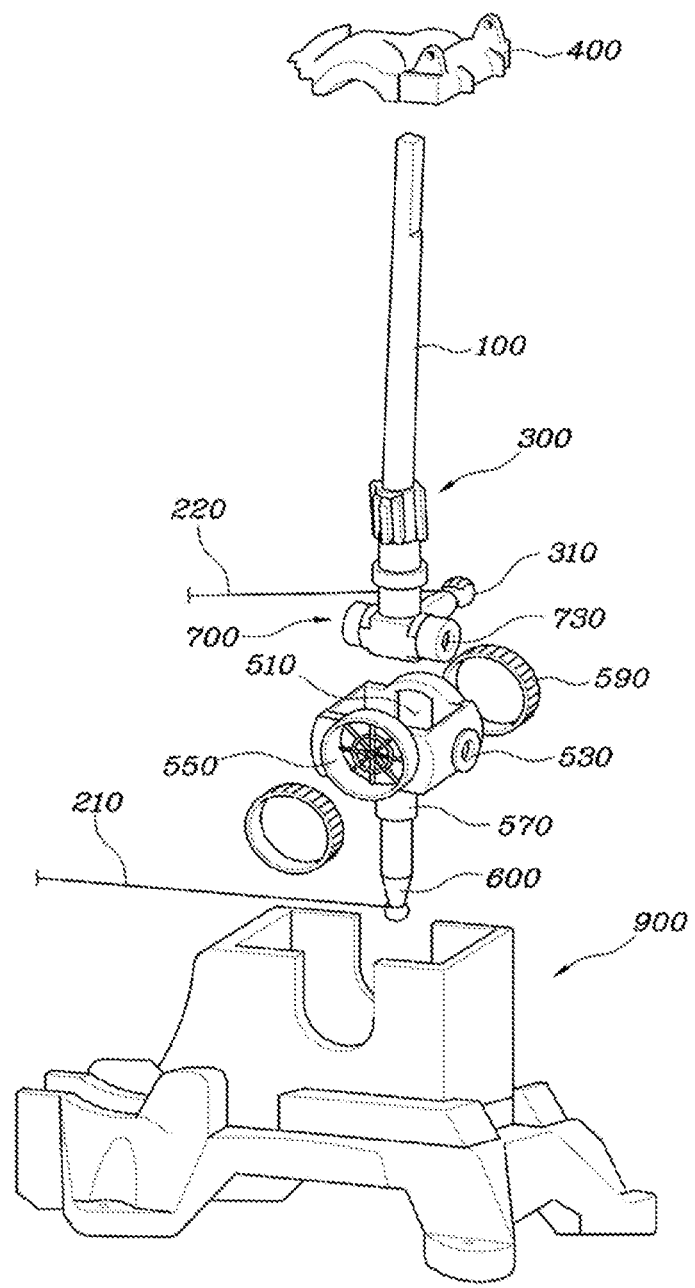
FIG. 2 is a detailed view of FIG. 1 according to an exemplary embodiment of the present invention.
Figure 3:
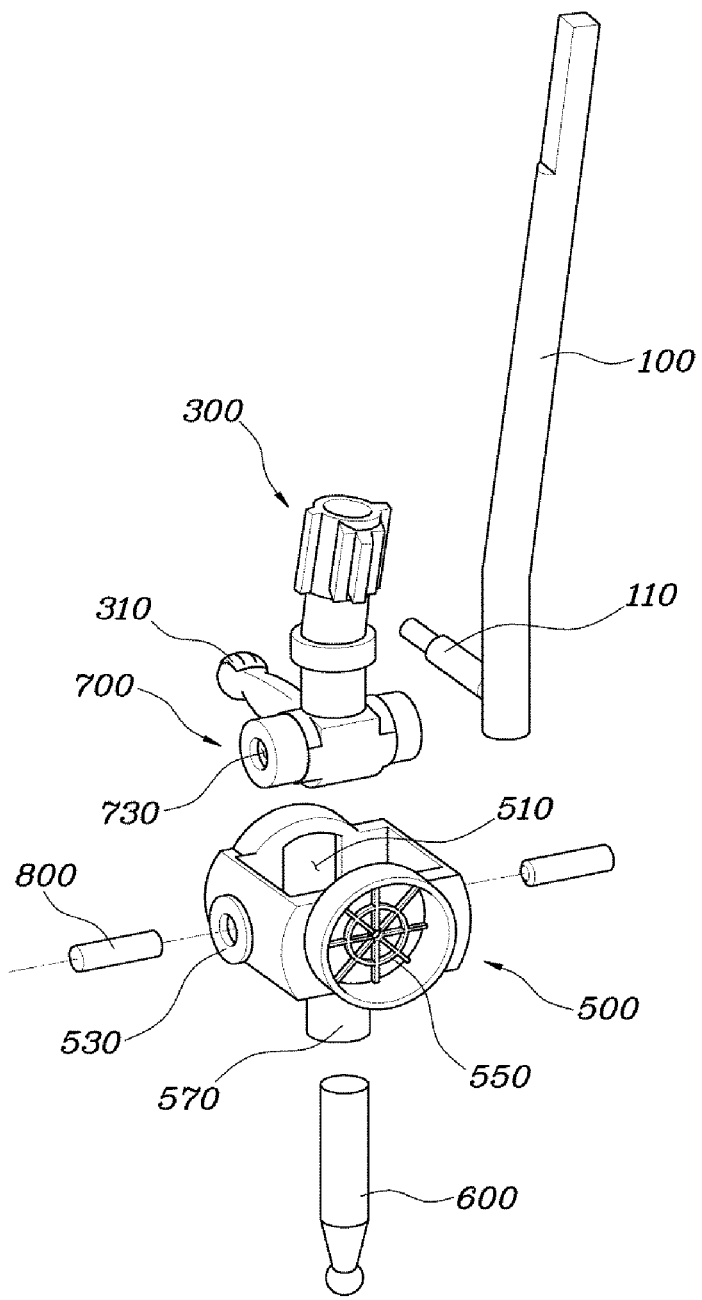
FIG. 3 is a perspective view showing components in detail from an upper lever to a lower lever according to an exemplary embodiment of the present invention.
Figure 4:
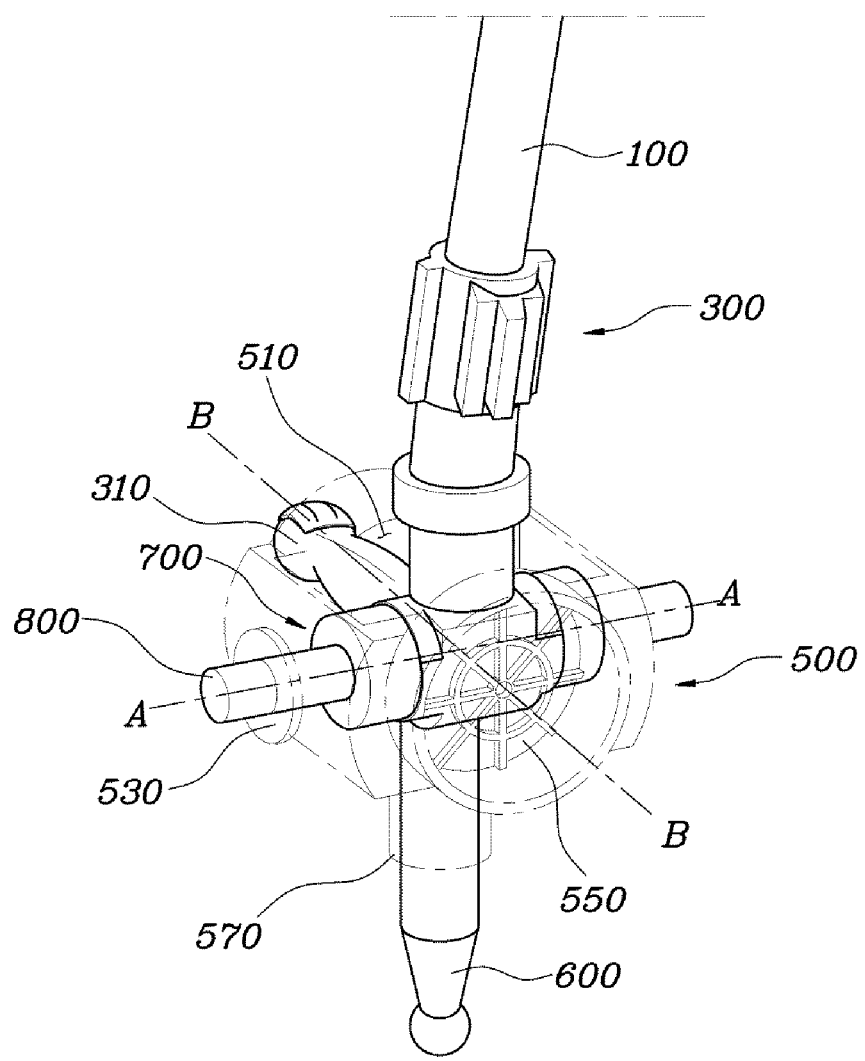
FIG. 4 is an assembly view of FIG. 3 according to an exemplary embodiment of the present invention.
Figure 5:
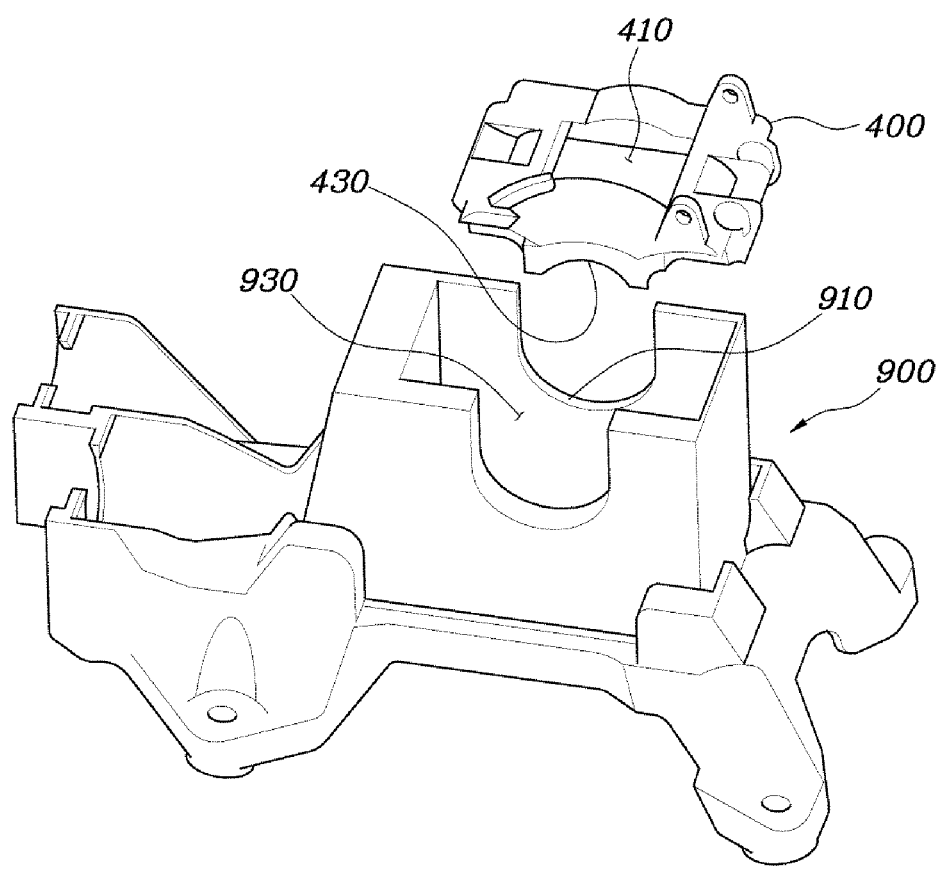
FIG. 5 is a view showing a housing cover and a shift-lever housing according to an exemplary embodiment of the present invention.

FIG. 1 is a perspective view of a shift-lever assembly of a manual transmission according to an exemplary embodiment of the present invention and FIG. 2 is a detailed view of FIG. 1. FIG. 3 is a perspective view showing components in detail from an upper lever 100 to a lower lever 600 and FIG. 4 is an assembly view of FIG. 3. FIG. 5 is a view showing a housing cover 400 and a shift-lever housing 900.

A shift-lever assembly of a manual transmission according to an exemplary embodiment of the present invention may include: a lower lever 600 rotatable forward and backward with respect to a shift-lever housing 900 and connected with one of a shift cable 210 and a selection cable 220; and an upper lever 100 coupled to the lower lever to be rotatable to the left and right and connected with the other of the cables 210 and 220.

It may be assumed herein that selecting refers to left-right rotation and shifting refers to forward-backward rotation. The selection cable 220 may be connected to the upper lever 100 and the shift cable 210 may be connected to the lower lever 600 in the figures, but are not limited thereto and may be freely changed based on the design and environment. The shift-lever assembly of a manual transmission of the present invention is described in detail hereafter.

Particularly, the upper lever 100 may be connected to a lower portion of a shifting knob (not shown) directly manipulated by a user to change gears. When the shift knob is manipulated to change gears, the force applied thereto may be transmitted to the shift-lever assembly through the upper lever 100. A lever holder 500 where the upper lever 100 is rotatably connected may be coupled to the lower lever 600. The lever holder 500 may include a lever shaft 800 and the upper lever 100 may be rotatably coupled to the lever holder 500 by the lever shaft 800. In particular, the lever shaft 800 may be disposed through the lever holder 500 and a rotary shaft assembly 700 in the forward-backward direction. As shown in FIG. 3, lever shafts 800 may be coupled to both sides of the lever holder 500, respectively, or one shaft may be disposed through the lever holder 500 and the rotary shaft assembly 700.

In addition, the upper lever 100 may include the rotary shaft assembly 700 rotatably coupled to the lever holder 500 and a cable protrusion 310 that extends from the rotary shaft assembly 700 to be connected with the shift cable 210. As shown in FIG. 3, an operation member 300 may be coupled to the lower end of the upper lever 100 by double injection molding. In particular, an extension 110 may extend laterally from a lower portion of the upper lever 100 and may be inserted and double-injection molded in the cable protrusion 310 to form a stronger structure. The upper portion of the operation member 300 may cover a predetermined portion of the lower portion of the upper lever 300. The selection cable 220 for selecting gears may be coupled to the cable protrusion 310. Accordingly, when the shift knob is moved left or right by the user to select a gear, the upper lever may be rotated left or right about the axis A of the rotary shaft assembly 700, and one of 1/2 stage, 3/4 stage, and 5/R stage may be selected.

The lever holder 500 may be a hollow circular rod having the longitudinal direction of which is oriented in the left-right direction of a vehicle and a circular hinge portion 550 having a circular cross-section and protruding outward may be formed at both sides of the lever holder 500. The rotational axis of the circular hinge portions 550 is the axis B of the lever holder 500. A bush 590 may be fitted on the circular hinge portions 550. In particular, multiple bushes 590 fitted on the circular hinge portions 550 (e.g., one on each circular hinge portion 550) allow the lever holder 500 to rotate forward and backward in the shift-lever housing 900. This structure is applied to ensure a rotational axis for the lever holder 500 rotating forward and backward and to position the cable protrusion 310 on the rotational axis, and accordingly, the lever holder 500 may be supported by the shift-lever housing 900 and the housing cover 400 to form a stronger structure.

As described above, the bushes 590 may reduce the friction between the shift-lever housing 900 and the lever holder 500 when the lower lever 600 is rotated and allow the circular hinge portions 550 to rotate about the shift-lever housing 900. Further, the bushes 590 may reduce friction and noise. The rotary shaft assembly 700 may be inserted in the lever holder 500 and the cable protrusion 310 may protrude outward from the lever holder 500 through a holder aperture 510 of the lever holder 500. The upper lever 100 may be rotated forward and backward about the axis B arranged in the longitudinal direction of the lever holder 500 (e.g., a cylinder), that is, in the left-right direction of a vehicle, and thus, as the upper lever 100 rotates, the lever holder 500 may be configured to rotate forward or backward to change gears.

The lower lever 600 connected with the shift cable 210 may be coupled to the lower portion of the lever holder 500. In particular, the lower lever 600 may be formed separately and the lower lever 600 may be coupled to the lever holder 500 to improve structural strength. Accordingly, a fitting portion 570 may extend downward from the lower portion of the lever holder 500 and the lower lever 600 may be fitted in the fitting portion 570. Accordingly, the rotary shaft assembly 700 and the lower lever 600 may be substantially spaced from each other in the lever holder 500, providing independent rotational centers and preventing interference with each other upon selecting or shifting. In other words, when the upper lever 100 is rotated to the left or right for selecting a gear, only the cable protrusion 310 moves vertically in the holder aperture 510 about the axis A of the rotary shaft assembly 700.

Further, when the upper lever 100 is rotated forward or backward for shifting, is the upper lever 100 may be rotated about the axis B of the lever holder 500, and thus, the rotary shaft assembly 700 may be configured to press the lever holder 700. Accordingly, the lever holder 500 may be configured to rotate while the cable protrusion 310 does not rotate vertically on the axis B. The axes that are the rotational centers for shifting and selecting are different in the present invention, and thus, left-right rotation and forward-backward rotation may be executed independently. When the upper lever 100 rotates to the left or the right, the rotary shaft assembly 700 may be configured to rotate relative to the inner side of the lever holder 500. Further, the lever holder 500 may be configured to rotate about the axis B when the upper lever 100 rotates forward or backward, the rotary shaft assembly 700 may be configured to press (e.g., apply forced onto or against) the lever holder 500 and the lever holder 500 may be configured to rotate forward or backward, to shift to one gear in the selected stage by the lower lever 600.

As described above, a through-aperture 730 may be formed longitudinally in the rotary shaft assembly 700 to more smoothly rotate the rotary shaft assembly 700 and the bar-shaped lever shaft 800 may be inserted in the through-aperture 730. Additionally, rotational apertures 530 may be formed in the lever holder 500 at positions that correspond to the lever shafts 800, and thus, when the upper lever 100 rotates to the left or right, the rotary shaft assembly 700 may be rotated relative to the lever holder 500 in the rotational apertures 530 by the lever shaft 800. When the upper lever 100 is rotated forward or backward, the lever shaft 800 may be configured to press the lever holder 500 forward or backward, causing the lever holder 500 to rotate forward or backward.

Further, as shown in FIG. 5, the shift-lever housing 900 may include a housing chamber 930 open upward to receive the lever holder 500. A housing bush groove 910 open upward to receive the bushes 590 fitted on the circular hinge portions 550 may be formed at both sides of the shift-lever housing 900. Additionally, a housing cover 400 may be coupled to the shift-lever housing 900 to close (e.g., cover) the open top of the housing chamber 930.

The edges of the bushes 590 inserted in the housing bush grooves 910 may protrude from the housing bush grooves 910 and a cover bush groove 430 may be formed at the left and right sides of the housing cover 400 to come in contact with the edges of the bushes 590 protruding from the housing bush grooves 910. Accordingly, the lever holder 500 may be coupled to the shift-lever housing 900 and the housing cover 400 and may be rotated relatively by the bushes 590. The lever holder 500 may be pressed downward by the housing cover 400, to fix the lever holder 500 and ensure stable operation. A fitting aperture 410 may be formed through the housing cover 400 and the upper lever 100 may be disposed through the fitting aperture 410. In addition, a plurality of fastening bores (not shown) for fastening the housing cover 400 may be formed at the shift-lever housing 900, to fasten the housing cover 400 to the shift-lever housing 900 in various ways using fasteners (not shown) such as snap pins or screws.

As shown in the figures, the operation member 300 and the lower lever 600 may be formed individually to achieve a double-axis arrangement since the rotational axes for left-right rotation and forward-backward rotation are different. Accordingly, the upper lever 100 may be rotated to the left or right about the axis A, and the rotary shaft assembly 700, through which the lever shafts 800 are inserted, may be rotated relative to the lever holder 500, to prevent rotation of the lower lever 600. Further, since the upper lever 100 may be rotated forward or backward about the axis B and the cable protrusion 310 may be formed on a line extending from the axis B, the cable protrusion 310 may be configured to rotate about the axis B without becoming eccentric from the axis B.

The reason for forming this structure is that the cable protrusion 310 connected with the selection cable 220 may be formed on the rotational axis when rotating forward or backward to simplify the structure but fasteners (not shown) such as bolts interfere with the cable protrusion 310 and accordingly it may be difficult to use fasteners. Thus, since the lever holder 500 may be fixed by the shift-lever housing 900 and the housing cover 400, as described above, such interference may be prevented and stable operation may be ensured.

Therefore, according to the shift-lever assembly of a manual transmission according to an exemplary embodiment of the present invention, the shift lever 210 may be not curved when the shift lever of a manual transmission is operated thus ensuring a smoother operation. Further, since curving of the shift cable 210 may be prevented, the durability of the shift cable 210 may be increased. In addition, since ball hinges are used as in the related art, it may be possible to reduce the number of parts, simplify the configuration, and decrease manufacturing costs, compared with the use of complicated U-joints in the related art.

Although the present invention was described with reference to specific exemplary embodiments shown in the drawings, it is apparent to those skilled in the art that the present invention may be changed and modified in various ways without departing from the scope of the present invention, which is described in the following claims.

What is claimed is:

1. A shift-lever assembly of a manual transmission, comprising:
    a lower lever rotatable forward and backward with respect to a shift-lever housing and connected with one of a shift cable and a selection cable; and
    an upper lever coupled to the lower lever to be rotatable left and right and connected with a remaining one of the shift cable and the selection cable,
    wherein a lever holder where the upper lever is rotatably connected is coupled to the lower lever, the lever holder includes a lever shaft, and the upper lever is rotatably coupled to the lever holder by the lever shaft,
    wherein a circular hinge portion that is a rotational center of the lever holder is formed at left and right sides of the lever holder and a bush is coupled to the circular hinge portions, and
    wherein the shift-lever assembly further includes:
        a housing chamber open upward to receive the lever holder is formed in the shift-lever housing;
        a housing bush groove open upward to receive the bushes coupled to the circular hinge portions is formed at both sides of the shift-lever housing; and
        a housing cover is coupled to the shift-lever housing to cover the open top of the housing chamber.

2. The shift-lever assembly of claim 1, wherein the upper lever includes a rotary shaft assembly rotatably coupled to the lever holder and a cable protrusion that extends from the rotary shaft assembly to be connected with the shift cable.

3. The shift-lever assembly of claim 2, wherein the lever shaft is disposed through the rotary shaft assembly in a left-right direction.

4. The shift-lever assembly of claim 2, wherein the rotary shaft assembly is inserted in the lever holder and the cable protrusion extends out of the lever holder through a holder aperture formed through the lever holder.

5. The shift-lever assembly of claim 1, wherein edges of the bushes inserted in the housing bush grooves protrude from the housing bush grooves and a cover bush groove is formed at left and right sides of the housing cover to come in contact with the edges of the bushes protruding from the housing bush grooves.

6. The shift-lever assembly of claim 1, wherein the cable connected to the lower lever is the shift cable.

7. The shift-lever assembly of claim 1, wherein the cable connected to the upper lever is the selection cable.

\* \* \* \* \*